(12) United States Patent
Mei et al.

(10) Patent No.: US 11,505,625 B2
(45) Date of Patent: Nov. 22, 2022

(54) POLYMERIZATION PROCESS INCLUDING DISCHARGING POLYOLEFIN PARTICLES FROM A GAS-PHASE POLYMERIZATION REACTOR

(71) Applicant: Basell Polyolefine GmbH, Wesseling (DE)

(72) Inventors: Gabriele Mei, Houston, TX (US); Giulia Mei, Ferrara (IT); Giuseppe Penzo, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 398 days.

(21) Appl. No.: 16/635,459

(22) PCT Filed: Aug. 2, 2018

(86) PCT No.: PCT/EP2018/071031
§ 371 (c)(1),
(2) Date: Jan. 30, 2020

(87) PCT Pub. No.: WO2019/025560
PCT Pub. Date: Feb. 7, 2019

(65) Prior Publication Data
US 2021/0102009 A1 Apr. 8, 2021

(30) Foreign Application Priority Data

Aug. 4, 2017 (EP) ..................................... 17184839

(51) Int. Cl.
*C08F 2/01* (2006.01)
*C08F 2/34* (2006.01)
(Continued)

(52) U.S. Cl.
CPC ............... *C08F 2/34* (2013.01); *B01J 8/1872* (2013.01); *B01J 8/24* (2013.01); *C08F 2/01* (2013.01);
(Continued)

(58) Field of Classification Search
CPC ............... C08F 2/01; C08F 2/34; C08F 10/00
See application file for complete search history.

(56) References Cited

U.S. PATENT DOCUMENTS 5,376,742 A 12/1994 Krause
9,399,688 B2 7/2016 Penzo et al.
(Continued)

FOREIGN PATENT DOCUMENTS

WO 9704015 A1 2/1997
WO 0002929 A1 1/2000
(Continued)

OTHER PUBLICATIONS

The International Search Report and the Written Opinion for PCT/EP2018/071031 dated Oct. 17, 2018.

*Primary Examiner* — Caixia Lu (57) ABSTRACT

A process for preparing an olefin polymer, including the steps of forming a particulate olefin polymer in a gas-phase polymerization reactor in the presence of a $C_3$-$C_5$ alkane as polymerization diluent, separating discharged polyolefin particles from concomitantly discharged gas at a pressure from 1 to 2.2 MPa, degassing the polyolefin particles at a pressure from 0.1 to 0.4 MPa with a gas made from or containing a $C_3$-$C_5$ alkane; and transferring the separated gas and the gas from the degassing to a work-up unit operated at a pressure from 0.001 to 0.2 MPa below the pressure of the separation, wherein the gas for degassing is continuously received from the work-up unit.

20 Claims, 1 Drawing Sheet

(51) Int. Cl.
  *C08F 10/00*  (2006.01)
  *B01J 8/18*   (2006.01)
  *B01J 8/24*   (2006.01)
  *C08F 10/02*  (2006.01)
  *C08F 10/08*  (2006.01)
  *C08F 10/14*  (2006.01)

(52) U.S. Cl.
  CPC .............. *C08F 10/02* (2013.01); *C08F 10/08* (2013.01); *C08F 10/14* (2013.01)

(56) References Cited

U.S. PATENT DOCUMENTS

| | | |
|---|---|---|
| 2010/0004408 A1 | 1/2010 | Baita et al. |
| 2015/0322178 A1 | 11/2015 | Penzo et al. |

FOREIGN PATENT DOCUMENTS

| | | |
|---|---|---|
| WO | 2006082097 A1 | 8/2006 |
| WO | 2007071527 A1 | 6/2007 |
| WO | 2008015228 A2 | 2/2008 |
| WO | 2012175469 A1 | 12/2012 |
| WO | 2013083548 A2 | 6/2013 |
| WO | 2014090860 A1 | 6/2014 |

POLYMERIZATION PROCESS INCLUDING DISCHARGING POLYOLEFIN PARTICLES FROM A GAS-PHASE POLYMERIZATION REACTOR

This application is the U.S. National Phase of PCT International Application PCT/EP2018/071031, filed Aug. 2, 2018, claiming benefit of priority to European Patent Application No. 17184839.3, filed Aug. 4, 2017, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure provides processes for preparing an olefin polymer in a gas-phase polymerization reactor.

BACKGROUND OF THE INVENTION

In some instances, gas-phase polymerization processes are used for the polymerization of olefins such as homopolymerizing ethylene or propylene or copolymerizing ethylene or propylene with other olefins. In some instances, reactors for carrying out such gas-phase polymerizations are fluidized-bed reactors, stirred gas-phase reactors or multizone circulating reactors with two distinct interconnected gas-phase polymerization zones. In some instances, these processes are carried out in a gas phase involving monomers and comonomers. In some further instances, the gaseous components also include polymerization diluents, molecular weight modifiers, or low-molecular weight reaction products. In some instances, the diluents are nitrogen or alkanes. In some instances, a molecular weight modifier is hydrogen. In some instances, the obtained products are solid polyolefin particles which are formed by polymerization catalyst systems. In many instances, the catalyst systems are made from or contain particulate catalyst solids.

When the produced material is continuously or discontinuously removed from the gas-phase polymerization reactors, the discharged product contains polyolefin and portions of the gaseous phase as intergranular gas or as dissolved hydrocarbons. For ecological, safety and quality reasons, these entrained parts of the gas-phase are to be removed from the polyolefin particles. In some instances, such components may constitute an adverse impact on the environment. The gaseous hydrocarbons may yield explosive mixtures in downstream equipment. Non-polymerized components may adversely affect quality, including odor formation.

In some instances the entrained parts of the gas-phase from the polyolefin particles are removed by contacting the particles with a stream of an inert gas. The inert gas may flow countercurrent. In some instances, such a step is denoted as "degassing" or "purging". In some instances, the degassing or purging step is combined with a step of deactivating the polymerization catalyst and/or cocatalysts. In some instances, deactivation occurs by reacting the catalyst and/or cocatalysts with water. Because the residual hydrocarbons in the polymer are in equilibrium with the surrounding gas phase, the achievable concentration of hydrocarbon residues in the polyolefin particles is the lower the lower the partial pressure of the component to be degassed is in the gas phase. In some instances, commercial degassing is carried out at ambient pressure or not much higher pressures.

SUMMARY OF THE INVENTION

In a general embodiment, the present disclosure provides a process for preparing an olefin polymer, including the steps of a) forming a particulate olefin polymer in a gas-phase polymerization reactor by homopolymerizing an olefin or copolymerizing an olefin and one or more other olefins at temperatures from 20 to 200° C. and pressures of from 0.5 to 10 MPa in the presence of a polymerization catalyst and a reaction gas made from or containing a $C_3$-$C_5$ alkane as polymerization diluent;

b) discharging the formed polyolefin particles from the polymerization reactor into a separation vessel being operated at a pressure from 1 to 2.2 MPa;

c) withdrawing a gaseous stream from the separation vessel;

d) transferring the gaseous stream into a reaction gas work-up unit, which is operated at a pressure from 0.001 to 0.2 MPa below the pressure of the separation vessel, thereby producing at least one liquid stream which is recycled to the polymerization reactor;

e) transferring the polyolefin particles from the separation vessel into a first degassing vessel operated at a pressure from 0.1 to 0.4 MPa;

f) contacting the polyolefin particles with a gaseous stream made from or containing from 85 to 100 vol.-% of a $C_3$-$C_5$ alkane in the first degassing vessel, wherein the gaseous stream is continuously received from the reaction gas work-up unit;

g) withdrawing the gaseous stream, which had been in contact with the polyolefin particles in the first degassing vessel, from the first degassing vessel;

h) compressing the gaseous stream to the pressure of the gaseous stream withdrawn from the separation vessel; and i) transferring the compressed gaseous stream into the reaction gas work-up unit, wherein the gaseous stream withdrawn from the separation vessel is worked up.

In some embodiments, the process further includes the steps of j) transferring the polyolefin particles from the first degassing vessel into a second degassing vessel; and k) contacting the polyolefin particles in the second degassing vessel at a pressure from 0.1 to 0.35 MPa with a stream made from or containing nitrogen and steam at conditions under which no condensation of water occurs.

In some embodiments, the process further includes the steps of l) transferring the polyolefin particles from the second degassing vessel into a third degassing vessel; and m) contacting the polyolefin particles in the third degassing vessel at a pressure from 0.1 to 0.2 MPa with a stream of nitrogen.

In some embodiments, in step i), the compressed gaseous stream withdrawn from the first degassing vessel is combined with the gaseous stream withdrawn from the separation vessel and the combined stream is transferred into the reaction gas work-up unit.

In some embodiments, the reaction gas work-up unit operates by distillation.

In some embodiments, the reaction gas work-up unit includes two separation stages.

In some embodiments, the contacting of the polyolefin particles in step f), and, if carried out, in step k) or in steps k) and m), is conducted countercurrently.

In some embodiments, in step k), the polyolefin particles are contacted with a gaseous stream made from or containing from 2 mol-% to 20 mol-% of water vapor.

In some embodiments, in step c), the gaseous stream withdrawn from the separation vessel is freed of entrained fine particles before in step d), being transferred into the reaction gas work-up unit.

In some embodiments, the gas-phase polymerization reactor is a stirred gas-phase reactor, a fluidized-bed reactor, or a multizone circulation reactor.

In some embodiments, in step b), the formed polyolefin particles are discharged from a position of the gas-phase polymerization reactor, at which the polyolefin particles are present in a densified bed of polyolefin particles.

In some embodiments, the content of $C_3$-$C_5$ alkane in the gas surrounding the polyolefin particles in the densified bed of polyolefin particles is higher than the average content of $C_3$-$C_5$ alkane in the reaction gas within the gas-phase polymerization reactor.

In some embodiments, the polymerization is a homopolymerization of ethylene or a copolymerization of ethylene and one or more other olefins selected from the group consisting of 1-butene, 1-hexene and 1-octene.

In some embodiments, the $C_3$-$C_5$ alkane employed as polymerization diluent in step a) is identical to the $C_3$-$C_5$ alkane in the gaseous stream employed for being contacted with the polyolefin particles in step f).

In some embodiments, the $C_3$-$C_5$ alkane is selected from the group consisting of propane, n-butane, isobutane, n-pentane or isopentane, and a mixture thereof.

DETAILED DESCRIPTION OF THE INVENTION

Figure 1:
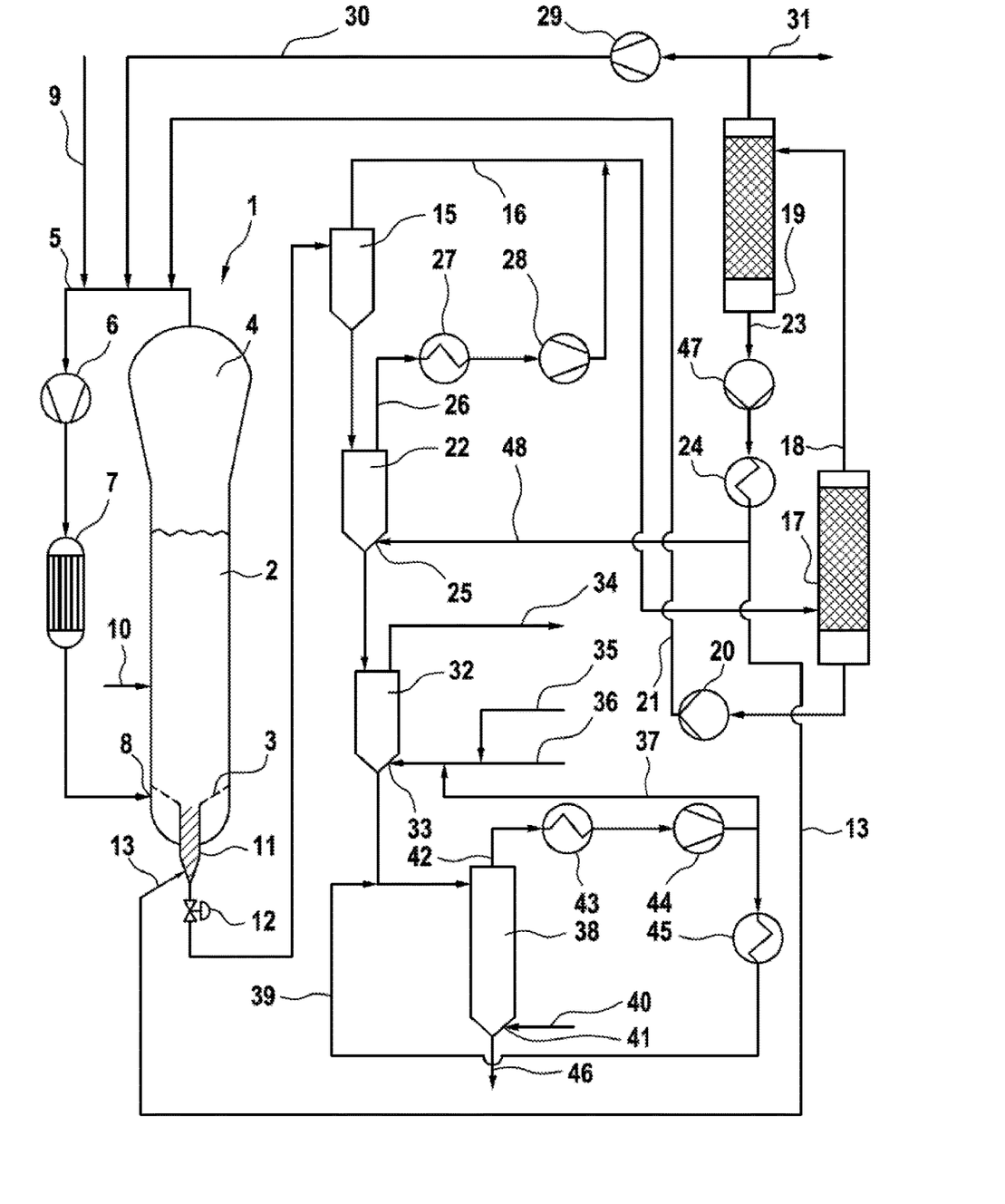
The FIGURE shows schematically a set-up for preparing an olefin polymer.

In a general embodiment, the present disclosure provides a process for preparing an olefin polymer. In some embodiments, olefins, which are utilized for preparing the olefin polymer, are 1-olefins, that is, hydrocarbons having terminal double bonds, without being restricted thereto. In some embodiments, the olefins are nonpolar olefinic compounds. In some embodiments, the 1-olefins are selected from the group consisting of linear or branched $C_2$-$C_{12}$-1-alkenes. In some embodiments, the linear $C_2$-$C_{10}$-1-alkenes are selected from the group consisting of ethylene, propylene, 1-butene, 1-pentene, 1-hexene, 1-heptene, 1-octene, and 1-decene. In some embodiments, the branched $C_2$-$C_{10}$-1-alkene is 4-methyl-1-pentene. In some embodiments, the olefins are conjugated or nonconjugated dienes. In some embodiments, the dienes are selected from the group consisting of 1,3-butadiene, 1,4-hexadiene and 1,7-octadiene. In some embodiments, the olefins are mixtures of various 1-olefins. In some embodiments, the olefins have the double bond as part of a cyclic structure which can have one or more ring systems. In some embodiments, the cyclic olefins are selected from the group consisting of cyclopentene, norbornene, tetracyclododecene or methylnorbornene or dienes such as 5-ethylidene-2-norbornene, norbornadiene or ethylnorbornadiene. In some embodiments, the olefins are mixtures of two or more olefins.

In some embodiments, the olefin polymer is a homopolymer or copolymer of ethylene or propylene. In some embodiments, the olefin polymer is a homopolymer or copolymer of ethylene. In some embodiments, the comonomers in propylene polymerization are up to 40 wt. % of ethylene, 1-butene and/or 1-hexene, alternatively from 0.5 wt. % to 35 wt. % of ethylene, 1-butene and/or 1-hexene. In some embodiments, the comonomers in ethylene polymerization are up to 20 wt. % of $C_3$-$C_8$-1-alkenes, alternatively from 0.01 wt. % to 15 wt. %, alternatively from 0.05 wt. % to 12 wt. %. In some embodiments, the $C_3$-$C_8$-1-alkenes are selected from the group consisting of 1-butene, 1-pentene, 1-hexene and 1-octene. In some embodiments, ethylene is copolymerized with from 0.1 wt. % to 12 wt. % of 1-hexene and/or 1-butene.

In step a) of the process of the present disclosure, a particulate olefin polymer is formed in a gas-phase polymerization reactor by homopolymerizing an olefin or copolymerizing an olefin and one or more other olefins. In some embodiments, the polymerization is carried out at temperatures from 20 to 200° C., alternatively from 30 to 160° C., alternatively from 65 to 125° C. and at pressures from 0.5 to 10 MPa, alternatively from 1.0 to 8 MPa, alternatively from 1.5 to 4 MPa, wherein these pressures are absolute pressures, that is, pressure having the dimension MPa (abs).

In some embodiments, the reactors are stirred gas-phase reactors, multizone gas-phase reactors, or gas-phase fluidized-bed reactors. In some embodiments, the stirred gas-phase reactors are horizontally or vertically stirred.

In some embodiments, the reactors are fluidized-bed reactors, that is, reactors including a bed of polymerizing polyolefin particles which are kept in fluidized state by introducing a gas from below. In some embodiments, the gas is taken off at the upper end of the reactor, cooled to remove the heat of polymerization and recirculated back into the reactor at its lower end.

In some embodiments, the reactors are multizone circulating reactors as described in Patent Cooperation Treaty Publication Nos. WO 97/04015 and WO 00/02929 and have two interconnected polymerization zones, a riser, wherein the growing polyolefin particles flow upward under fast fluidization or transport conditions and a downcomer, wherein the growing polyolefin particles flow in a densified form under the action of gravity. The polyolefin particles leaving the riser enter the downcomer and the polyolefin particles leaving the downcomer are reintroduced into the riser, thereby establishing a circulation of polymer between the two polymerization zones and the polymer is passed alternately a plurality of times through these two zones. In some embodiments, the two polymerization zones of a multizone circulating reactor operate with different polymerization conditions by establishing different polymerization conditions in the riser and the downcomer. For this purpose and in some embodiments, the gas mixture leaving the riser and entraining the polyolefin particles is partially or totally prevented from entering the downcomer. In some embodiments, the particles are prevented entry of the downcomer by feeding a barrier fluid in form of a gas and/or a liquid mixture into the downcomer. In some embodiments, the gas/liquid mixture is fed in the upper part of the downcomer. In some embodiments, the barrier fluid has a composition different from that of the gas mixture present in the riser. In some embodiments, the amount of added barrier fluid is adjusted such that an upward flow of gas countercurrent to the flow of the polyolefin particles is generated, acting as a barrier to the gas mixture entrained among the particles coming from the riser. In some embodiments, the countercurrent is at the top of the downcomer. In some embodiments, two different gas composition zones are obtained in a multizone circulating reactor. In some embodiments, make-up monomers, comonomers, molecular weight regulators, and/or inert fluids are introduced at any point of the downcomer. In some embodiments, these components are introduced below the barrier feeding point. In some embodiments, the molecular weight regulator is hydrogen. In some embodiments, varying monomer, comonomer and hydrogen concentrations are established along the downcomer, thereby further differentiating the polymerization conditions.

The process of the present disclosure is carried out in the presence of a polymerization catalyst. In some embodiments, the olefin polymerization catalysts include Phillips catalysts based on chromium oxide, Ziegler- or Ziegler-Natta-catalysts, or single-site catalysts. As used herein, the term "single-site catalysts" refers to catalysts based on chemically uniform transition metal coordination compounds. In some embodiments, the polymerization uses mixtures of two or more of these catalysts for the polymerization of olefins. In some embodiments, these mixed catalysts are designated as hybrid catalysts.

In some embodiments, the catalysts are of the Ziegler type, alternatively made from or containing a compound of titanium or vanadium, a compound of magnesium and optionally an electron donor compound and/or a particulate inorganic oxide as a support material.

In some embodiments, catalysts of the Ziegler type are polymerized in the presence of a cocatalyst. In some embodiments, cocatalysts are organometallic compounds of metals of Groups 1, 2, 12, 13 or 14 of the Periodic Table of Elements, alternatively organometallic compounds of metals of Group 13, alternatively organoaluminum compounds. In some embodiments, cocatalysts are organometallic alkyls, organometallic alkoxides, or organometallic halides.

In some embodiments, organometallic compounds are made from or contain lithium alkyls, magnesium or zinc alkyls, magnesium alkyl halides, aluminum alkyls, silicon alkyls, silicon alkoxides and silicon alkyl halides. In some embodiments, the organometallic compounds are made from or contain aluminum alkyls and magnesium alkyls. In some embodiments, the organometallic compounds are made from or contain aluminum alkyls, alternatively trialkylaluminum compounds or compounds of this type wherein an alkyl group is replaced by a halogen atom. In some embodiments, the halogen atom is chlorine or bromine. In some embodiments, the aluminum alkyls are selected from the group consisting of trimethylaluminum, triethylaluminum, tri-isobutylaluminum, tri-n-hexylaluminum or diethylaluminum chloride or mixtures thereof.

In some embodiments, the catalysts are Phillips-type chromium catalyst. In some embodiments, the Phillips-type chromium catalyst is prepared by applying a chromium compound to an inorganic support and subsequently activating the obtained catalyst precursor at temperatures in the range from 350 to 1000° C., resulting in chromium present in valences lower than six being converted into the hexavalent state. In some embodiments and apart from chromium, further elements such as magnesium, calcium, boron, aluminum, phosphorus, titanium, vanadium, zirconium or zinc are used. In some embodiments, the further elements are titanium, zirconium or zinc. In some embodiments, combinations of the abovementioned elements are used. In some embodiments, the catalyst precursor is doped with fluoride prior to or during activation. In some embodiments and as supports for Phillips-type catalysts, aluminum oxide, silicon dioxide (silica gel), titanium dioxide, zirconium dioxide or their mixed oxides or cogels, or aluminum phosphate are used. In some embodiments, support materials are obtained by modifying the pore surface area. In some embodiments, the pore surface is modified with compounds of the elements boron, aluminum, silicon or phosphorus. In some embodiments, the support is a silica gel. In some embodiments, the silica gels are spherical or granular silica gels. In some embodiments, the spherical silica gels are spray dried. In some embodiments, the activated chromium catalysts is subsequently prepolymerized or prereduced. In some embodiments, the prereduction is carried out with cobalt or hydrogen at 250° C. to 500° C., alternatively at 300° C. to 400° C., in an activator.

The obtained polyolefin particles have a more or less regular morphology and size, depending on the catalyst morphology and size, and on polymerization conditions. In some embodiments and depending on the catalyst used, the polyolefin particles have a mean diameter of from a few hundred to a few thousand micrometers. In some embodiments and in the case of chromium catalysts, the mean particle diameter is from about 300 to about 1600 μm. In some embodiments and in the case of Ziegler type catalysts, the mean particle diameter is from about 500 to about 3000 μm.

The process of the present disclosure is carried out with a reaction gas made from or containing a $C_3$-$C_5$ alkane as polymerization diluent, that is, a reaction gas made from or containing propane, butane or pentane or a mixture thereof or of their isomers. In some embodiments, $C_3$-$C_5$ alkanes are selected from the group consisting of propane, n-butane, isobutane, n-pentane, isopentane, and mixtures thereof. In some embodiments, the polymerization is carried out in the presence of propane. In some embodiments, the homopolymerization or copolymerization of ethylene is carried out in the presence of propane. In some embodiments, the reaction gas mixture is further made from or containing nitrogen as additional polymerization diluent. The reaction gas mixture within the reactor additionally is made from or containing the olefins to be polymerized, that is, a main monomer and one or more optional comonomers. In some embodiments, the reaction gas mixture has a content of inert components from 30 to 99 vol. %, alternatively from 50 to 95 vol. %, alternatively from 60 to 90 vol. %. In some embodiments, the reaction gas mixture is further made from or containing additional components such as antistatic agents or molecular weight regulators. In some embodiments, the molecular weight regulator is hydrogen. In some embodiments, the components of the reaction gas mixture are fed into the gas-phase polymerization reactor in gaseous form or as liquid which vaporizes within the reactor. In some embodiments, the polymerization is carried out in a condensing or super-condensing mode, wherein part of the circulating gas is cooled to below the dew point and returned to the reactor separately as a liquid and a gas phase or together as a two-phase mixture to make additional use of the enthalpy of vaporization for cooling the reaction gas.

In step b) of the process of the present disclosure, the polyolefin particles formed in step a) are discharged from the polymerization reactor into a separation vessel. In some embodiments, the discharge is carried out pneumatically, by gravity or with the aid of mechanical discharge systems. In some embodiments, the discharge occurs with pneumatic discharge and/or by gravity, wherein a pneumatic discharge achieved by the pressure gradient prevailing between the polymerization reactor and the first downstream vessel. In some embodiments, the discharge is carried out discontinuously or continually. In some embodiments, the polyolefin particles are discharged continuously from the gas-phase polymerization reactor.

In some embodiments, the discharge of polyolefin particles occurs at any position of the gas-phase polymerization reactor. In some embodiments, the polyolefin particles are discharged from a position of the gas-phase polymerization reactor, whereat the polyolefin particles are present in a densified bed of polyolefin particles.

In some embodiments and when carrying out the polymerization in a fluidized-bed reactor, the polyolefin particles are discharged directly from the fluidized-bed reactor. In some embodiments, the polyolefin particles are discharged as described in Patent Cooperation Treaty Publication No. WO 2012/175469 A1. In some embodiments, the fluidized-bed reactor is equipped with a continuous pneumatic recycle of the polyolefin particles by a circulation loop which connects the fluidization grid with the upper region of the fluidized-bed reactor, as described in Patent Cooperation Treaty Publication No. WO 2007/071527 A1. In some embodiments, the circulation loop includes below the fluidized-bed reactor a vertical pipe, wherein the polyolefin particles are present in a densified bed of polyolefin particles. In some embodiments, the fluidized-bed reactor includes a vertical settling pipe, which is integrated with its upper opening into the distribution grid and which contains a densified bed of polyolefin particles, as described in Patent Cooperation Treaty Publication No. WO 2013/083548 A2. In some embodiments, the polyolefin particles are discharged from the lower end of the settling pipe.

In some embodiments and when carrying out the polymerization in a multizone circulating reactor, the polyolefin particles are discharged directly from the downcomer, wherein the polyolefin particles are present in a densified bed of polyolefin particles.

In some embodiments and when discharging the polyolefin particles from a densified bed of polyolefin particles, the proportion of $C_3$-$C_5$ alkane in the gas surrounding the polyolefin particles in the densified bed is higher than in the average proportion of $C_3$-$C_5$ alkane in the gas within the gas-phase polymerization reactor.

In some embodiments and when carrying out the process in a gas-phase reactor equipped with a vertical pipe, wherein polyolefin particles are present as a densified bed of polyolefin particles and the discharge of polyolefin particles takes place from this pipe, a fluid is introduced into the pipe in an amount that an upward stream of the fluid is induced in the bed of polyolefin particles above the fluid introduction point. In some embodiments, the fluid is the $C_3$-$C_5$ alkane utilized as polymerization diluent.

In some embodiments and when carrying out the process in a multizone circulating reactor, the polyolefin particles are discharged from the downcomer and the polymerization is carried out such that the content of $C_3$-$C_5$ alkane in the reaction gas within the downcomer is higher than the content of $C_3$-$C_5$ alkane in the reaction gas within the riser.

The separation vessel, into which the polyolefin particles are discharged from the polymerization reactor, is operated at a pressure from 1 to 2.2 MPa, alternatively at a pressure from 1.5 to 2.0 MPa. Within the separation vessel, the polyolefin particles discharged from the polymerization reactor are separated from a major part of the concomitantly discharged gas mixture.

In step c) of the process of the present disclosure, a gaseous stream is withdrawn from the separation vessel. In step d, the gaseous stream is transferred into a reaction gas work-up unit which is operated at a pressure from 0.001 to 0.2 MPa, alternatively from 0.005 to 0.15 MPa, alternatively from 0.01 to 0.05 MPa, below the pressure of the separation vessel. In some embodiments, the transfer into the reaction gas work-up unit occurs by the pressure difference between the pressure within the separation vessel and the pressure of the reaction gas work-up unit.

In some embodiments and in step c), the gaseous stream withdrawn from the separation vessel is freed of entrained fine particles before being transferred into the reaction gas work-up unit. In some embodiments, the removal of the fine particles occurs by employing a filter.

In step d) the reaction gas work-up unit produces at least one liquid stream which is recycled to the polymerization reactor. In some embodiments, the reaction gas work-up unit produces one or more liquid streams and one or more gaseous streams by working up the reaction gas. In some embodiments, one or more of the liquid streams, which are recycled to the polymerization reactor, are evaporated before being recycled to the polymerization reactor. In some embodiments, the reaction gas work-up unit separates the $C_3$-$C_5$ alkanes from higher molecular weight or lower molecular weight components. In some embodiments, separation occurs by distillation or condensation. In some embodiments, separation occurs by distillation.

In some embodiments, the reaction gas work-up unit includes two separation stage, one separation stage primarily for separating the $C_3$-$C_5$ alkanes from higher molecular weight gas components, and one separation stage primarily for separating the $C_3$-$C_5$ alkanes from lower molecular weight gas components. In some embodiments, the higher molecular weight gas components are higher molecular weight alkanes or higher molecular weight olefins. In some embodiments, the higher molecular weight alkanes are selected from the group consisting of hexane and octane. In some embodiments, the higher molecular weight olefins are selected from the group consisting of 1-hexene and 1-octene. In some embodiments, the $C_3$-$C_5$ alkane is propane while the higher molecular weight alkane is selected from the group consisting of butane, hexane and octane. In some embodiments, the $C_3$-$C_5$ alkane is propane while the higher molecular weight olefins are selected from the group consisting of 1-butene, 1-hexene and 1-octene. In some embodiments, the lower molecular weight gas components are selected from the group consisting of ethane, ethylene, hydrogen and nitrogen. In some embodiments, the gas stream first passes the separation stage for separating the $C_3$-$C_5$ alkanes from higher molecular weight gas components or the separation stage for separating the $C_3$-$C_5$ alkanes from lower molecular weight gas components. In some embodiments, the gas stream first passes the separation stage for separating the $C_3$-$C_5$ alkanes from higher molecular weight gas components.

In some embodiments, the first separation stage is a distillation column for separating the $C_3$-$C_5$ alkanes from higher molecular weight gas components. In some embodiments, the gaseous stream coming from the separation vessel is fed as side stream to a first distillation column. In some embodiments, the liquid bottom stream of the first distillation column, which consists of high-boiling components of the gaseous stream fed to the reaction gas work-up unit, is recycled to the gas-phase polymerization reactor by a pump. The gaseous top stream of the first distillation column is fed as side stream to a second distillation column. The gaseous top stream of the second distillation column is brought by a compressor to the pressure of the gas-phase polymerization reactor and recycled to the reactor. The liquid bottom stream of the second distillation column, which consists mainly of $C_3$-$C_5$ alkanes, is utilized for the degassing of the polyolefin particles in the first degassing vessel. For this purpose and in some embodiments, the liquid bottom stream of the second distillation column is transferred by a pressure gradient to a heat exchanger, evaporated and then fed as degassing medium to the first degassing vessel. In some embodiments, the liquid bottom stream of the second distillation column is brought to a pressure higher than the pressure within the polymerization reactor by a pump, and, after being evaporated in the heat exchanger, is further fed to a part of the gas-phase polymerization reactor close to the position where the polyolefin particles are discharged to reduce the concentration of low-molecular weight components in the gas concomitantly discharged with the polyolefin particles from the polymerization reactor. In some embodiments, any additional amounts of the liquid bottom stream of the second distillation column are recycled to the gas-phase polymerization reactor. In some embodiments, the recycling occurs after being the liquid bottom stream is evaporated in the heat exchanger. In some embodiments, the ratio of the part of the liquid bottom stream of the second distillation column, which is fed as degassing medium to the first degassing vessel, to the part of the liquid bottom stream of the second distillation column, which is recycled to the polymerization reactor, is in the range from 1:50 to 1:2, alternatively in the range from 1:20 to 1:5. It is believed that operating the distillation at a pressure in the range from 1 to 2.2 MPa, alternatively from 1.5 to 2 MPa, allows utilizing water as cooling medium for condensing the $C_3$-$C_5$ alkane, without installing an energy consuming refrigeration device.

In step e), the polyolefin particles are transferred from the separation vessel into a first degassing vessel. In some embodiment, the transfer occurs by the pressure gradient prevailing between the separation vessel and the first degassing vessel. In some embodiments, the polyolefin particles are transferred continuously from the separation vessel to the first degassing vessel. The first degassing vessel is operated at a pressure from 0.1 to 0.4 MPa, alternatively from 0.12 MPa to 0.35 MPa, alternatively from 0.15 MPa to 0.3 MPa.

Within the first degassing vessel, the polyolefin particles are contacted in step f) with a gaseous stream made from or containing from 85 to 100 vol.-% of a $C_3$-$C_5$ alkane. In some embodiments, the gaseous stream is made from or contains from 90 to 100 vol.-%, alternatively from 95 to 100 vol.-%, of the $C_3$-$C_5$ alkane. In some embodiments, the $C_3$-$C_5$ alkane of the gaseous stream is identical to the $C_3$-$C_5$ alkane which is used as polymerization diluent in the gas-phase polymerization reactor. In some embodiments, the $C_3$-$C_5$ alkane is propane. In some embodiments, the gaseous stream made from or containing from 85 to 100 vol.-% of $C_3$-$C_5$ alkane is fed to the degassing vessel in an amount of from 10 kg to 200 kg per 1000 kg of polyolefin particles to be degassed. In some embodiments, the contacting of step f) is carried out at a temperature from 50° C. to 120° C., alternatively from 60° C. to 100° C., alternatively from 70° C. to 90° C. In some embodiments, the residence time of the polyolefin particles in the first degassing vessel is from 5 minutes to 5 hours, alternatively from 10 minutes to 4 hours, alternatively from 15 minutes to 2 hours. In some embodiments, the contacting is carried out countercurrently. In some embodiments, the polyolefin particles are then introduced in the upper portion of the first degassing vessel and move downwards by gravity in contact with a countercurrent flow of a gaseous stream which is introduced at the bottom of the degassing vessel at one or more positions.

The gaseous stream for being contacted with the polyolefin particles in the first degassing vessel is continuously received from the reaction gas work-up unit. In some embodiments, this gaseous stream is obtained in the reaction gas work-up unit by evaporating the liquid bottom stream of a second distillation column. In some embodiments and by being contacted with the polyolefin particles, the gaseous stream is enriched with unreacted monomer, comonomers, oligomers and other hydrocarbons.

In step g), the gaseous stream, which had been in contact with the polyolefin particles in the first degassing vessel, is withdrawn from the first degassing vessel. In step h), the gaseous stream is compressed to the pressure of the gaseous stream withdrawn from the separation vessel. In step i, the compressed gaseous stream is transferred into the reaction gas work-up unit, wherein the gaseous stream withdrawn from the separation vessel is worked up. In some embodiments, the compressed gaseous stream withdrawn from the first degassing vessel is combined with the gaseous stream withdrawn from the separation vessel and the combined stream is transferred into the reaction gas work-up unit.

In some embodiments, the polyolefin particles, which had been contacted with the gaseous stream made from or containing from 85 to 100 vol.-% of $C_3$-$C_5$ alkane in the first degassing vessel, are transferred in a step j) into a second degassing vessel and contacted, in a step k), in the second degassing vessel at a pressure from 0.1 to 0.35 MPa with a stream made from or containing nitrogen and steam at conditions under which no condensation of water occurs. In some embodiments, the transfer is effected by gravity and a pressure gradient between the first and the second degassing vessel.

In some embodiments and in the second degassing vessel, the contacting of the polyolefin particles and the stream comprising nitrogen and steam is carried out countercurrently. In some embodiments, the polyolefin particles are introduced at the top of the second degassing vessel and move downwards by gravity in contact with a countercurrent flow of the stream made from or containing nitrogen and steam which is introduced at the bottom of the degassing vessel at one or more positions.

The stream for degassing the polyolefin particles in the second degassing vessel is made from or contains steam in an amount that no condensation of water occurs at the conditions within the second degassing vessel. In some embodiments, the stream is made from or contains from 2 mol-% to 20 mol-%, alternatively from 5 mol-% to 15 mol-% of water vapor. In some embodiments, the steam is added in form of superheated or saturated steam, alternatively slightly superheated steam. In some embodiments, the nitrogen for forming the stream made from or containing nitrogen and steam is at least partly not fresh nitrogen but nitrogen coming from a third degassing step, wherein the nitrogen had been contacted with polyolefin particles having been transferred from the second to the third degassing vessel. In some embodiments, the stream made from or containing nitrogen and steam is fed to the second degassing vessel in an amount of from 10 kg to 150 kg per 1000 kg of polyolefin particles to be degassed, alternatively from 20 kg to 80 kg per 1000 kg of polyolefin particles to be degassed.

In some embodiments, a gas mixture enriched with unreacted comonomers, oligomers, other hydrocarbons and made from or containing reaction products of the reaction of the water vapor with the components of the polymerization catalyst system is withdrawn from the second degassing vessel after contacting the stream comprising nitrogen and steam with the polyolefin particles. In some embodiments, the withdrawal takes from the top of the second degassing vessel. In some embodiments, this gas mixture is taken off the polymerization system as off-gas and, after having passed a simple neutralization unit, disposed. In some embodiments, the disposal takes place via a catalytic oxidation unit.

In some embodiments, it is believed that a relatively small amount of steam is used in the second degassing vessel because the water vapor has mainly the function of deactivating the catalyst components. In some embodiments, the organoaluminum compounds of the polymerization catalyst system are deactivated.

In some embodiments, step k) is carried out at a pressure from 0.1 MPa to 0.35 MPa, alternatively 0.11 MPa to 0.25 MPa and a temperature from 50° C. to 120° C., alternatively from 60° C. to 100° C., alternatively from 70° C. to 90° C. In some embodiments, the residence time of the polyolefin particles in the second degassing vessel is from 5 minutes to 2 hours, alternatively from 10 minutes to 1 hour.

In some embodiments, the polyolefin particles are transferred, in a step l), to a third degassing vessel after having been contacted with the stream made from or containing nitrogen and steam in the second degassing vessel. In the third degassing vessel, the polyolefin particles are contacted, as a step m), with a stream of nitrogen. In some embodiments, the transfer of the polyolefin particles from the second degassing vessel to the third degassing vessel is effected by a stream of nitrogen which had previously been used for contacting the polyolefin particles in step m), that is, which had been withdrawn from the third degassing vessel and is reused as conveying medium for the particle transfer from the second to the third degassing vessel. In some embodiments, the contacting of step m) is carried out in a parallel arrangement in two or more third degassing vessels at one or more positions.

In some embodiments and in the third degassing vessel, the contacting of the polyolefin particles and the stream of nitrogen is carried out countercurrently. In some embodiments, the polyolefin particles are introduced at the top of the third degassing vessel and move downwards by gravity in contact with a countercurrent flow of a nitrogen stream introduced at the bottom of the degassing vessel.

In some embodiments and subsequent to contacting the nitrogen stream with the polyolefin particles, a gas mixture enriched in unreacted comonomers, oligomers and other hydrocarbons is withdrawn from the third degassing vessel. In some embodiments, the withdrawal is from the top of the third degassing vessel. In some embodiments, the gas mixture is then cooled in a heat exchanger, compressed and then reused for both forming a part of the gaseous stream for degassing in the second degassing vessel and, after being cooled in a further heat exchanger, for transporting the polyolefin particles from the second degassing vessel to the third degassing vessel.

In some embodiments, step m) is carried out at a pressure from 0.1 MPa to 0.2 MPa, alternatively 0.1 MPa to 0.15 MPa and a temperature from 50° C. to 120° C., alternatively from 60° C. to 100° C., alternatively from 70° C. to 90° C. In some embodiments, the residence time of the polyolefin particles in the third degassing vessel is from 5 minutes to 10 hours, alternatively from 10 minutes to 6 hours, alternatively from 20 minutes to 4 hours.

After being contacted with the respective gas streams in the first degassing vessel or in the first and the second degassing vessel or in the first, the second and the third degassing vessel, the polyolefin particles are transferred to the further work-up. In some embodiments, the polyolefin particles are provided with polymer additives and/or being pelletized in an extrusion step.

The FIGURE shows schematically a set-up for preparing an olefin polymer.

Gas-phase polymerization reactor (1) is a fluidized-bed reactor including a fluidized bed (2) of polyolefin particles, a gas distribution grid (3) and a velocity reduction zone (4). The velocity reduction zone (4) is of increased diameter compared to the diameter of the fluidized-bed portion of the reactor. The polyolefin bed is kept in fluidized state by an upwardly flow of gas fed through the gas distribution grid (3) placed in a bottom portion of the reactor (1). The gaseous stream of the reaction gas leaving the top of the velocity reduction zone (4) via recycle line (5) is compressed by compressor (6), transferred to a heat exchanger (7), wherein the gaseous stream is cooled, and then recycled to the bottom of the fluidized-bed reactor (1) at a point below the gas distribution grid (3) at position (8). In some embodiments, the recycled gas is cooled to below the dew point of the recycled gas mixture in the heat exchanger, thereby operating the reactor with condensed material, that is, in the condensing mode. The recycled gas is made from or contains, besides unreacted monomers, a $C_3$-$C_5$ alkane as polymerization diluent. In some embodiments, make-up monomers, molecular weight regulators, and process additives are fed into the reactor (1) at various positions. In some embodiments, the make-up monomers, molecular weight regulators, and process additives are fed via line (9) upstream of the compressor (6). In some embodiments, the catalyst is fed into the reactor (1) via a line (10). In some embodiments, line (10) is placed in the lower part of the fluidized bed (2).

The fluidized-bed reactor (1) is further made from or containing a settling pipe (11), which is vertically arranged and integrated with its upper opening centrally into the gas distribution grid (3). The gas distribution grid (3) is endowed with a cone shape such that the downward inclination towards the settling pipe (11) fosters the entry of the polyolefin particle into the settling pipe (11) due to gravity.

During operation of fluidized-bed reactor (1), the settling pipe (11) contains a bed of polyolefin particles which moves from top to bottom of the settling pipe. The polyolefin particles enter the settling pipe (11) through the upper opening and the polyolefin particles are withdrawn through discharge valve (12). In some embodiments, the settling pipe (11) is further equipped with a line (13) for feeding a fluid such that an upward stream of the fluid in the bed of polyolefin particles within the settling pipe (11) is induced. In some embodiments, line (13) is positioned near the lower end of the settling pipe. In some embodiments, the introduced fluid is the $C_3$-$C_5$ alkane utilized as polymerization diluent.

The polyolefin particles discharged from the settling pipe (11) through discharge valve (12) are transferred via line (14) into a separation vessel (15), wherein the polyolefin particles are separated from a major part of the concomitantly discharged reaction gas. The separated gas is withdrawn from the top of separation vessel (15) and transferred through line (16) to a first separation column (17). A low-boiling fraction is withdrawn from the top of the first separation column (17) and transferred through line (18) to a second separation column (19). A high-boiling fraction is withdrawn from the bottom of the first separation column (17) and transferred by a pump (20) through line (21) to the recycle line (5).

The polyolefin particles separated from the major part of the concomitantly discharged reaction gas are transferred from the separation vessel (15) to a first degassing vessel (22), wherein the polyolefin particles are contacted with a gaseous stream which comes from the second separation column (19). The liquid withdrawn from the bottom of the second separation column (19) through line (23) is pressurized by a pump (47) to a pressure higher than the pressure within the fluidized-bed reactor (1) and then evaporated in heat exchanger (24). The gaseous stream coming from the heat exchanger (24) is split, and a part of the evaporated liquid is fed via line (48) to degassing vessel (22) at the bottom at position (25). The other part of the evaporated liquid is fed to the settling pipe (11) via line (13).

Within degassing vessel (22), the gas flows upwards countercurrently to the flow of the polyolefin particles. The gas leaving the degassing vessel (22) via line (26) is made from or containing beside gas, which had been fed at position (25), the remaining portion of the concomitantly discharged reaction gas, which was not separated off in the separation vessel (15), and gaseous components, which come out from the polyolefin particles. The gas stream leaving the degassing vessel (22) via line (26) is cooled in a heat exchanger (27) and transferred by compressor (28) to line (16) for being transferred to the first separation column (17).

The low-boiling fraction withdrawn from the top of the second separation column (19) is mainly returned to the polymerization by compressor (29) through line (30) to recycle line (5). A minor part of the low-boiling fraction withdrawn from the top of the second separation column (19) is branched off into line (31) and purged.

At the bottom of degassing vessel (22), polyolefin particles are withdrawn and transferred to a second degassing vessel (32) by gravity. The polyolefin particles are contacted with a stream of nitrogen and steam which is fed to the degassing vessel (32) at the bottom at position (33). Within degassing vessel (32), the stream of nitrogen and steam flows upwards countercurrently to the flow of the polyolefin particles. The conditions in the degassing vessel (32) are selected such that no condensation of water occurs.

The gas leaving degassing vessel (32) via line (34) exits the polymerization system as off-gas. In some embodiments, the gas mixture for degassing the polyolefin particles in the second degassing step is made from or containing steam fed via line (35) and nitrogen, which is added as fresh nitrogen via line (36) or as reused nitrogen coming from the subsequent third degassing step via line (37). In some embodiments, at least the major part of the nitrogen fed to the degassing vessel (32) at position (33) is reused nitrogen coming via line (37).

At the bottom of degassing vessel (32), polyolefin particles are withdrawn and transferred to a third degassing vessel (38) by reused nitrogen coming via line (39). In the third degassing vessel (38), the polyolefin particles are countercurrently contacted with a stream of nitrogen, which is fed as fresh nitrogen via line (40) at position (41). The gas leaving the third degassing vessel (38) via line (42) is cooled in a heat exchanger (43), compressed by compressor (44) and fed to both line (37) for being further used as part of the gas stream in the second degassing vessel (32) and to heat exchanger (45) for being cooled and then used via line (39) for transporting polyolefin particles from degassing vessel (32) to degassing vessel (38).

At the bottom of degassing vessel (38), polyolefin particles are withdrawn and transferred via line (46) to the further work-up such as being provided with polymer additives and pelletized in an extrusion step.

What is claimed is:

1. A process for preparing an olefin polymer, comprising the steps of
    a) forming a particulate olefin polymer in a gas-phase polymerization reactor by homopolymerizing an olefin or copolymerizing an olefin and one or more other olefins at temperatures from 20 to 200° C. and pressures of from 0.5 to 10 MPa in the presence of a polymerization catalyst and a reaction gas comprising a $C_3$-$C_5$ alkane as polymerization diluent;
    b) discharging the formed polyolefin particles from the polymerization reactor into a separation vessel being operated at a pressure from 1 to 2.2 MPa;
    c) withdrawing a gaseous stream from the separation vessel and transferring the gaseous stream into a reaction gas work-up unit, which is operated at a pressure from 0.001 to 0.2 MPa below the pressure of the separation vessel and which produces at least one liquid stream which is recycled to the polymerization reactor;
    d) transferring the polyolefin particles from the separation vessel into a first degassing vessel operated at a pressure from 0.1 to 0.4 MPa; and
    e) contacting therein the polyolefin particles with a gaseous stream comprising from 85 to 100 vol.-% of a $C_3$-$C_5$ alkane, wherein the gaseous stream is continuously received from the reaction gas work-up unit;
    f) withdrawing the gaseous stream, which had been in contact with the polyolefin particles in the first degassing vessel, from the first degassing vessel, compressing the gaseous stream to the pressure of the gaseous stream withdrawn from the separation vessel, and transferring the compressed gaseous stream into the reaction gas work-up unit, in which the gaseous stream withdrawn from the separation vessel is worked up.

2. The process of claim 1, wherein the process further comprises the steps of
    g) transferring the polyolefin particles from the first degassing vessel into a second degassing vessel; and
    h) contacting therein the polyolefin particles at a pressure from 0.1 to 0.35 MPa with a stream comprising nitrogen and steam at conditions under which no condensation of water occurs.

3. The process of claim 2, wherein the process further comprises the steps of
    i) transferring the polyolefin particles from the second degassing vessel into a third degassing vessel; and
    j) contacting therein the polyolefin particles at a pressure from 0.1 to 0.2 MPa with a stream of nitrogen.

4. The process of claim 1, wherein, in step f), the compressed gaseous stream withdrawn from the first degassing vessel is combined with the gaseous stream withdrawn from the separation vessel and the combined stream is transferred into the reaction gas work-up unit.

5. The process of claim 1, wherein the reaction gas work-up unit operates by distillation.

6. The process of claim 1, wherein the reaction gas work-up unit comprises two separation stages.

7. The process of claim 1, wherein the contacting of the polyolefin particles in step e), and, if carried out, in step h) or in steps h) and j) is conducted countercurrently.

8. The process of claim 1, wherein, in step h), the polyolefin particles are contacted with a gaseous stream comprising from 2 mol-% to 20 mol-% of water vapor.

9. The process of claim 1, wherein, in step c), the gaseous stream withdrawn from the separation vessel is freed of entrained fine particles before being transferred into the reaction gas work-up unit.

10. The process of claim 1, wherein the gas-phase polymerization reactor is a stirred gas-phase reactor, a fluidized-bed reactor, or a multizone circulation reactor.

11. The process of claim 1, wherein, in step b), the formed polyolefin particles are discharged from a position of the gas-phase polymerization reactor, at which the polyolefin particles are present in a densified bed of polyolefin particles.

12. The process of claim 11, wherein the content of $C_3$-$C_5$ alkane in the gas surrounding the polyolefin particles in the densified bed of polyolefin particles is higher than the average content of $C_3$-$C_5$ alkane in the reaction gas within the gas-phase polymerization reactor.

13. The process of claim 1, wherein the polymerization is a homopolymerization of ethylene or a copolymerization of ethylene and one or more other olefins selected from the group consisting of 1-butene, 1-hexene and 1-octene.

14. The process of claim 1, wherein the $C_3$-$C_5$ alkane employed as polymerization diluent is identical to the $C_3$-$C_5$ alkane comprised in the gaseous stream employed for being contacted with the polyolefin particles in steps e).

15. The process of claim 1, wherein the $C_3$-$C_5$ alkane is propane, n-butane, isobutane, n-pentane or isopentane, or a mixture thereof.

16. A process for preparing an olefin polymer, comprising the steps of
   a) forming a particulate olefin polymer in a gas-phase polymerization reactor by homopolymerizing an olefin or copolymerizing an olefin and one or more other olefins at temperatures from 20 to 200° C. and pressures of from 0.5 to 10 MPa in the presence of a polymerization catalyst and a reaction gas comprising a $C_3$-$C_5$ alkane as polymerization diluent;
   b) discharging the formed polyolefin particles from the polymerization reactor into a separation vessel being operated at a pressure from 1 to 2.2 MPa;
   c) withdrawing a gaseous stream from the separation vessel and transferring the gaseous stream into a reaction gas work-up unit, which is operated at a pressure from 0.001 to 0.2 MPa below the pressure of the separation vessel and which produces at least one liquid stream which is recycled to the polymerization reactor;
   d) transferring the polyolefin particles from the separation vessel into a first degassing vessel operated at a pressure from 0.1 to 0.4 MPa;
   e) contacting therein the polyolefin particles with a gaseous stream comprising from 85 to 100 vol.-% of a $C_3$-$C_5$ alkane, wherein the gaseous stream is continuously received from the reaction gas work-up unit;
   f) withdrawing the gaseous stream, which had been in contact with the polyolefin particles in the first degassing vessel, from the first degassing vessel, compressing the gaseous stream to the pressure of the gaseous stream withdrawn from the separation vessel, and transferring the compressed gaseous stream into the reaction gas work-up unit, in which the gaseous stream withdrawn from the separation vessel is worked up;
   g) transferring the polyolefin particles from the first degassing vessel into a second degassing vessel;
   h) contacting therein the polyolefin particles at a pressure from 0.1 to 0.35 MPa with a stream comprising nitrogen and steam at conditions under which no condensation of water occurs;
   i) transferring the polyolefin particles from the second degassing vessel into a third degassing vessel; and
   j) contacting therein the polyolefin particles at a pressure from 0.1 to 0.2 MPa with a stream of nitrogen.

17. The process of claim 16, wherein, in step f), the compressed gaseous stream withdrawn from the first degassing vessel is combined with the gaseous stream withdrawn from the separation vessel and the combined stream is transferred into the reaction gas work-up unit.

18. The process of claim 16, wherein the contacting of the polyolefin particles in step e), h) and j) is conducted countercurrently.

19. The process of claim 16, wherein, in step h), the polyolefin particles are contacted with a gaseous stream comprising from 2 mol-% to 20 mol-% of water vapor.

20. The process of claim 16, wherein, in step b), the formed polyolefin particles are discharged from a position of the gas-phase polymerization reactor, at which the polyolefin particles are present in a densified bed of polyolefin particles and the content of $C_3$-$C_5$ alkane in the gas surrounding the polyolefin particles in the densified bed of polyolefin particles is higher than the average content of $C_3$-$C_5$ alkane in the reaction gas within the gas-phase polymerization reactor.

* * * * *